United States Patent
Lim

(10) Patent No.: US 9,331,325 B2
(45) Date of Patent: May 3, 2016

(54) BATTERY PACK

(71) Applicants: SAMSUNG SDI CO., LTD., Yongin-si, Gyeonggi-do (KR); ROBERT BOSCH GMBH, Stuttgart (DE)

(72) Inventor: Young-Bin Lim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 364 days.

(21) Appl. No.: 13/760,865

(22) Filed: Feb. 6, 2013

(65) Prior Publication Data
US 2013/0280560 A1  Oct. 24, 2013

(30) Foreign Application Priority Data
Apr. 20, 2012 (KR) .................. 10-2012-0041485

(51) Int. Cl.
*H01M 2/34* (2006.01)
*H01M 10/42* (2006.01)
*H01M 2/10* (2006.01)

(52) U.S. Cl.
CPC .............. *H01M 2/34* (2013.01); *H01M 2/1077* (2013.01); *H01M 2/347* (2013.01); *H01M 10/425* (2013.01); *H01M 2010/4271* (2013.01); *H01M 2200/103* (2013.01); *H01M 2220/20* (2013.01)

(58) Field of Classification Search
CPC ....................................................... H01M 2/34
USPC ........................................................ 429/34
See application file for complete search history.

(56) References Cited

U.S. PATENT DOCUMENTS

| | | |
|---|---|---|
| 5,238,083 A | 8/1993 | Horie et al. |
| 6,417,579 B1 | 7/2002 | Lehnst et al. |
| 8,258,651 B2 | 9/2012 | Duan et al. |
| 2002/0084636 A1 | 7/2002 | Lewallen et al. |
| 2005/0184495 A1 | 8/2005 | Zerbe |
| 2007/0139007 A1 | 6/2007 | Lim et al. |
| 2007/0152432 A1 | 7/2007 | Uchida |
| 2007/0291425 A1 | 12/2007 | Yugou |

(Continued)

FOREIGN PATENT DOCUMENTS

| | | |
|---|---|---|
| DE | 42 34551 C1 | 1/1994 |
| EP | 2 400 628 A2 | 12/2011 |

(Continued)

OTHER PUBLICATIONS

European Search Report and Written Opinion for Patent Application No. 13164583.0, dated Nov. 21, 2013, 6 pages.

(Continued)

*Primary Examiner* — Stewart Fraser
(74) *Attorney, Agent, or Firm* — Lewis Roca Rothgerber Chritie LLP

(57) ABSTRACT

A battery pack including: a plurality of battery modules, each including a plurality of battery cells arranged in a direction; at least one first fuse between battery modules of the plurality of battery modules; a battery control unit connected to the at least one first fuse; and at least one sensing unit connected to the battery control unit, the battery control unit being configured to transfer a signal received from the at least one sensing unit to the at least one first fuse, and the at least one first fuse including a power cutoff unit at a region of a connection member connecting the battery modules to each other, and a case surrounding the power cutoff unit.

12 Claims, 6 Drawing Sheets

(56) References Cited

U.S. PATENT DOCUMENTS

| | | |
|---|---|---|
| 2008/0086250 A1 | 4/2008 | Kuivenhoven |
| 2008/0157718 A1 | 7/2008 | Ohnuki |
| 2008/0236999 A1* | 10/2008 | Kahnert ............... 200/7 |
| 2009/0079434 A1 | 3/2009 | Osawa et al. |
| 2010/0134068 A1 | 6/2010 | Lim |
| 2010/0264878 A1 | 10/2010 | Ueda et al. |
| 2010/0305792 A1 | 12/2010 | Wilk et al. |
| 2011/0261498 A1 | 10/2011 | Ikeda et al. |
| 2012/0081068 A1* | 4/2012 | Odaohhara et al. ........... 320/107 |
| 2012/0194004 A1* | 8/2012 | Lim ............... 307/125 |
| 2012/0194139 A1 | 8/2012 | Sasaki et al. |
| 2012/0327562 A1* | 12/2012 | Hara et al. ............... 361/622 |

FOREIGN PATENT DOCUMENTS

| | | |
|---|---|---|
| EP | 2 482 367 A2 | 8/2012 |
| EP | 2 482 375 A1 | 8/2012 |
| JP | 04-208007 | 7/1992 |
| JP | 06-234342 | 8/1994 |
| JP | 2002-531310 | 9/2002 |
| JP | 2003-165406 | 6/2003 |
| JP | 2004-146307 A | 5/2004 |
| JP | 2004-152706 A | 5/2004 |
| JP | 2004-311290 | 11/2004 |
| JP | 2006-340577 A | 12/2006 |
| JP | 2007-331606 | 12/2007 |
| JP | 2008-091183 A | 4/2008 |
| JP | 2009-081964 | 4/2009 |
| JP | 2009-158219 A | 7/2009 |
| JP | 2009-194980 A | 8/2009 |
| JP | 2009-224262 | 10/2009 |
| JP | 2010-003619 A | 1/2010 |
| JP | 2010-123517 A | 6/2010 |
| JP | 2010-252592 | 11/2010 |
| JP | 2010-264830 A | 11/2010 |
| JP | 2012-156025 | 8/2012 |
| KR | 1997-0051619 | 7/1997 |
| KR | 20-1998-0013259 U | 6/1998 |
| KR | 10-1998-049720 | 9/1998 |
| KR | 10-0211570 B1 | 5/1999 |
| KR | 10-2006-0083684 | 7/2006 |
| KR | 10-2006-0102667 | 9/2006 |
| KR | 10-2007-0093753 | 9/2007 |
| KR | 10-2012-0010377 A | 2/2012 |
| WO | WO 2010/138744 A2 | 12/2010 |
| WO | WO 2011/042807 A1 | 4/2011 |

OTHER PUBLICATIONS

EPO Office action dated May 3, 2012, corresponding to European Patent application 11176046.8, (7 pages).

EPO Office action dated Sep. 27, 2012, corresponding to European Patent application 11176046.8, (18 pages).

EPO Office action dated Jun. 6, 2013, corresponding to European Patent application 11176046.8, (7 pages).

KIPO Office action dated May 1, 2012, corresponding to Korean Patent application 10-2011-0009514, (4 pages).

KIPO Notice of Allowance dated Nov. 1, 2012, corresponding to Korean Patent application 10-2011-0009514, (1 page).

JPO Office action dated Nov. 13, 2012 corresponding to Japanese Patent application 2011-092912 (6 pages).

JPO Office action dated Apr. 2, 2013 corresponding to Japanese Patent application 2011-092912, (3 pages).

JPO Office action dated Sep. 17, 2013 corresponding to Japanese Patent application 2011-092912, (2 pages).

U.S. Office action dated Mar. 14, 2014, for cross reference U.S. Appl. No. 13/116,987, (17 pages).

U.S. Office action dated Aug. 15, 2014, for cross reference U.S. Appl. No. 13/116,987, (10 pages).

U.S. Office action dated Mar. 26, 2015, for cross reference U.S. Appl. No. 13/116,987, (9 pages).

Notice of Allowance in cross-reference U.S. Appl. No. 13/116,987, filed May 26, 2011, inventor Young-Bin Lim, Notice of Allowance mailed Aug. 19, 2015 (9 pgs.).

Examiner Interview Summary in cross-reference U.S. Appl. No. 13/116,987, filed May 26, 2011, inventor Young-Bin Lim, Examiner Interview Summary mailed Jul. 13, 2015 (2 pgs.).

Office action dated Mar. 18, 2016, for corresponding Japanese Patent Application No. 2012-136658; filed Jun. 18, 2012 (5 pages).

* cited by examiner

BATTERY PACK

CROSS-REFERENCE TO RELATED APPLICATION

This application claims priority to and the benefit of Korean Patent Application No. 10-2012-0041485, filed on Apr. 20, 2012 in the Korean Intellectual Property Office, the entire content of which is incorporated herein by reference.

BACKGROUND

1. Field

Aspects of embodiments of the present invention relate to a battery pack.

2. Description of the Related Art

In general, battery cells are used as energy sources for mobile devices, electric vehicles, hybrid vehicles, and the like. The shape of the battery cells may be variously selected depending on the kind of external device to which the battery cell is applied.

A small-sized mobile device such as a cellular phone can be operated with the power and capacity of a single battery cell for a certain period of time. However, in a case where long-time driving and high-power driving are necessary, such as for an electric vehicle, a hybrid vehicle, or the like, which has large power consumption, a large-capacity battery module is configured by electrically connecting a plurality of battery cells so as to increase power and capacity. The battery module increases output voltage or current according to the number of battery cells built therein.

A battery pack may be configured by electrically connecting a plurality of battery modules. The battery pack includes a battery control unit so as to control the state of each battery cell. The battery control unit may be operated to cut off current applied to a specific battery cell or battery module according to a signal received therefrom.

SUMMARY

According to an aspect of embodiments of the present invention, in a battery pack, when a sensing unit senses that the battery pack is damaged, a battery control unit transfers the sensed signal to first fuses, thereby cutting off electrical connections between battery modules.

According to another aspect of embodiments of the present invention, a battery pack includes an interlock circuit or separate circuit configured to operate first fuses positioned between battery modules, thereby cutting off electrical connections between the battery modules.

According to an embodiment of the present invention, a battery pack includes: a plurality of battery modules, each including a plurality of battery cells arranged in a direction; at least one first fuse between battery modules of the plurality of battery modules; a battery control unit connected to the at least one first fuse; and at least one sensing unit connected to the battery control unit, the battery control unit being configured to transfer a signal received from the at least one sensing unit to the at least one first fuse, and the at least one first fuse including a power cutoff unit at a region of a connection member connecting the battery modules to each other, and a case surrounding the power cutoff unit.

Pressure or heat may be generated in the power cutoff unit by the signal transferred from the battery control unit.

The at least one sensing unit may include an airbag impact sensor.

The battery pack may further include an airbag control unit between the airbag impact sensor and the battery control unit.

The airbag impact sensor may concurrently transfer the signal to the battery control unit and the airbag control unit.

The airbag impact sensor may transfer the signal to the battery control unit through the airbag control unit.

The at least one sensing unit may include an airbag impact sensor, a moisture sensor, and an impact sensor.

The battery control unit may be connected to the power cutoff unit of the at least one first fuse by a signal input line.

The battery pack may further include a second fuse on an output line of the battery module.

The at least one first fuse and the second fuse may be operated concurrently or individually.

The battery pack may further include a second fuse on an input line of the battery module.

The battery pack may further include an interlock circuit configured to selectively control the at least one first fuse for repairing the battery pack.

According to an aspect of embodiments of the present invention, when the insulation of the battery pack is broken due to impact or submergence, or as occasion demands, the output voltage of the battery pack is decreased to the voltage level of any one battery module, such that a risk of fire or electrical shock is prevented or reduced, thereby improving the safety of the battery pack. As such, a rechargeable battery according to embodiments of the present invention is suited for application in an electric vehicle or a hybrid electric vehicle.

BRIEF DESCRIPTION OF THE DRAWINGS

The accompanying drawings, together with the specification, illustrate some exemplary embodiments of the present invention, and, together with the description, serve to explain aspects and principles of the present invention.

DETAILED DESCRIPTION

Figure 1:
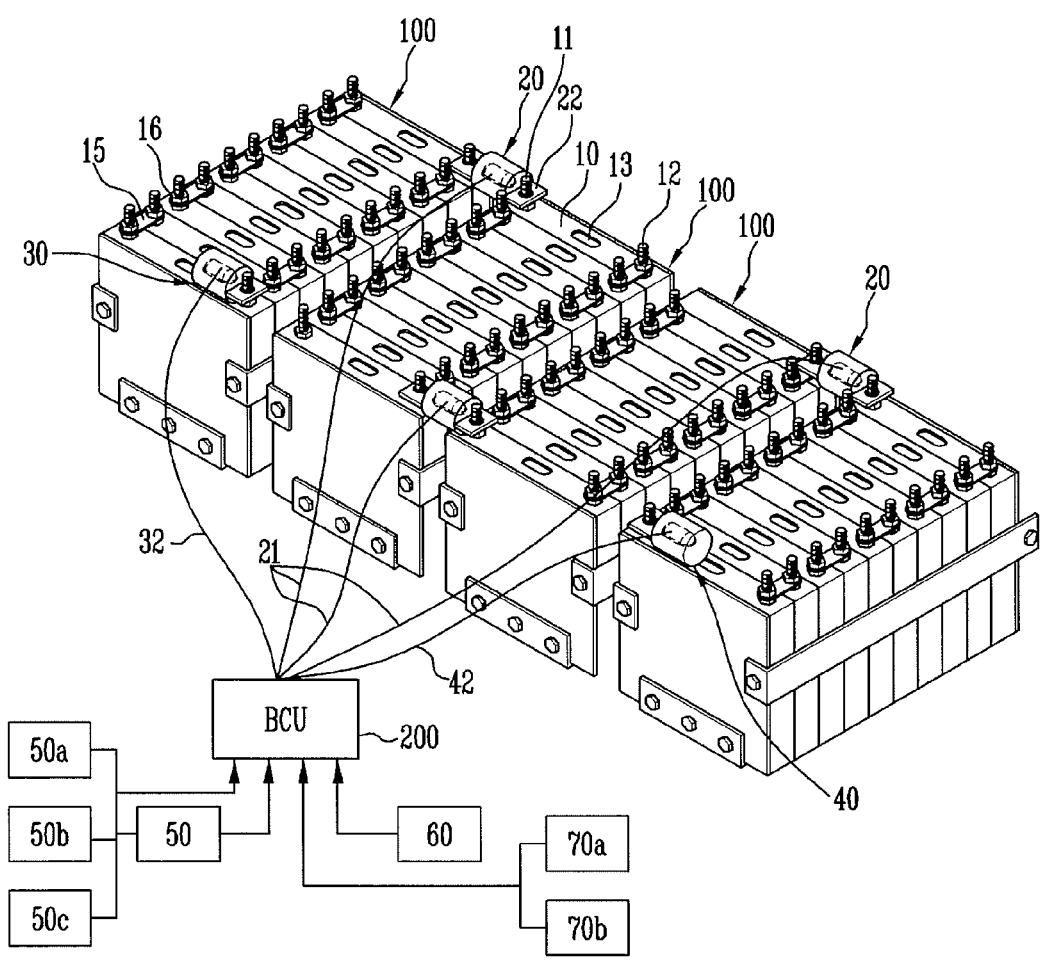
FIG. 1 is a schematic perspective view of a battery pack according to an embodiment of the present invention.

In the following detailed description, certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it may be directly on the another element or indirectly on the another element with one or more intervening elements interposed therebetween. Also, when an element is referred to as being "connected to" another element, it may be directly connected to the another element or indirectly connected to the another element with one or more intervening elements connected therebetween. Hereinafter, like reference numerals refer to like elements. In the drawings, the thicknesses or sizes of components or layers may be exaggerated for clarity or purposes of illustration and not necessarily drawn to scale.

Figure 2:
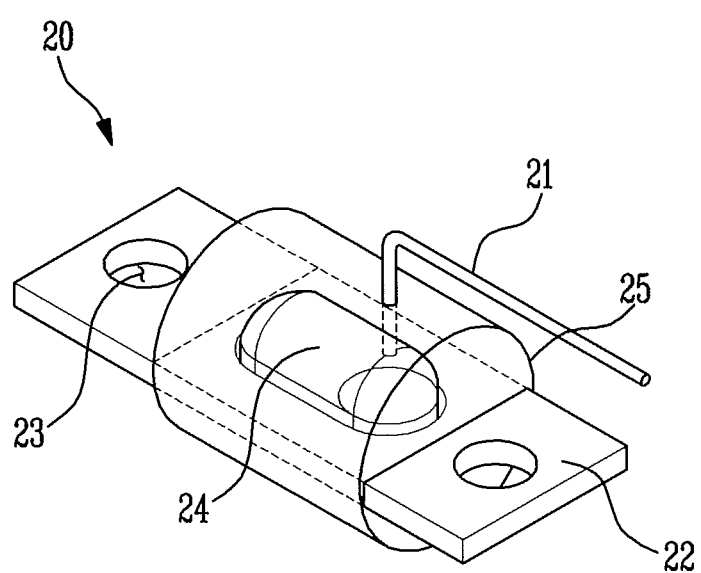
FIG. 2 is a perspective view of a first fuse of the battery pack of FIG. 1.

FIG. 1 is a schematic perspective view of a battery pack according to an embodiment of the present invention. FIG. 2 is a perspective view of a first fuse of the battery pack of FIG. 1.

Referring to FIGS. 1 and 2, a battery pack according to an embodiment of the present invention includes one or more battery modules 100, one or more first fuses 20, second fuses 30 and 40, a battery control unit (BCU) 200, and at least one sensing unit 50a, 50b, 50c, 60, 70a and 70b.

In one embodiment, the first fuse 20 includes a power cutoff unit 24 formed at a region of a connection member 22 connecting the battery modules 100 to each other, and a case 25 surrounding the power cutoff unit 24. In one embodiment, the BCU 200 may be connected to the power cutoff unit 24 of the first fuse 20 by a signal input line 21. Pressure or heat may be generated in the power cutoff unit 24 by a signal transferred from the BCU 200. The power cutoff unit 24, in one embodiment, may be formed as a solenoid valve.

The first fuse 20 according to one embodiment includes the power cutoff unit 24 formed at a region of the connection member 22 electrically connecting the battery modules 100 to each other, and the case 25 surrounding the power cutoff unit 24. In one embodiment, if the BCU 200 transfers a signal to the power cutoff unit 24 to cut off power, pressure or heat is generated in the power cutoff unit 24, and the connection member 22 is melted. Accordingly, the battery modules 100 can be electrically disconnected from each other. In one embodiment, the connection member 22 is formed of a material having a structure vulnerable to heat and/or impact, and the connection member 22 is melted and/or broken by impact and/or heat generated in the power cutoff unit 24, such that the power between the battery modules 100 can be cut off.

In one embodiment, the power cutoff unit 24 may be exploded due to the pressure generated therein, and fragments of the exploded power cutoff unit 24 may be accommodated in the case 25 surrounding the power cutoff unit 24. Accordingly, if the first fuse 20 receives the signal from the BCU 200, the first fuse 20 may cut off current flowing between the battery modules 100 in a moment, thereby decreasing the voltage of the battery pack.

The battery module 100 according to one embodiment is a high-voltage and high-capacity battery module, and has a structure in which a plurality of battery cells 10 are arranged at an interval along a direction. The battery cells 10 may be formed in any of various suitable shapes, such as in a prismatic shape as shown and described herein.

The battery cell 10 may have an electrode assembly in which positive and negative electrode plates are disposed with a separator interposed therebetween, and may be configured to have a general structure for charging/discharging an amount (e.g., a predetermined amount) of power. In one embodiment, positive and negative electrode terminals 11 and 12 are protruded from the top of each of the battery cells 10 while maintaining an interval. In one embodiment, each of the positive and negative electrode terminals 11 and 12 is formed having a shape of a bolt having screw threads formed thereon.

The positive and negative electrode terminals 11 and 12 of one battery cell 10 may be arranged to cross the positive and negative electrode terminals 11 and 12 of another battery cell 10 adjacent to the one battery cell 10. In one embodiment, a bus bar 15 is connected to the positive electrode terminal 11 of one battery cell 10 and the negative electrode terminal 12 of another battery cell 10 adjacent to the one battery cell 10, and the positive and negative electrode terminals 11 and 12 may be fastened with the bus bar 15 by a nut 16.

The positive and negative electrode terminals 11 and 12 of the battery cells 10, in one embodiment, are fastened with the bus bars 15 to form the battery module 100 in which the plurality of battery cells 10 are electrically connected to one another. In the battery module 100, the fastening structure between the positive and negative electrode terminals 11 and 12 and the bus bars 15 is repeated, such that the plurality of battery cells 10 can be connected in series to one another.

In one embodiment, as illustrated in FIG. 1, four battery modules 100, for example, are electrically connected to one another, and the first fuses 20 are provided between the respective battery modules 100. The first fuse 20 may be provided to the connection member 22 connecting the adjacent battery modules 100 to each other. That is, the positive electrode terminal 11 of the battery cell 10 in one battery module 100 and the negative electrode terminal 12 of the battery cell 10 in another battery module 100 adjacent to the one battery module 100 are electrically connected by the connection member 22. The connection member 22 may have openings 23 to couple to the positive electrode terminal 11 and the negative electrode terminal 12. The first fuse 20, in one embodiment, is formed at a region of the connection member 22, so as to cut off the electrical connection between the adjacent battery modules 100 as occasion demands.

The positive and negative electrode second fuses 30 and 40 may be installed on output lines 31 and 41 of the battery modules 100 at both ends of the battery modules 100 (e.g., the four battery modules 100) and connected to the BCU 200 by signal input lines 32 and 42, respectively.

The first fuses 20 and the positive and negative electrode second fuses 30 and 40 may be electrically connected to the BCU 200. Accordingly, the first fuses 20 and the positive and negative electrode second fuses 30 and 40 can be controlled and operated according to a signal from the BCU 200. Particularly, the first fuse 20 can cut off the electrical connection between the battery modules 100. In one embodiment, the signal may be transferred to the BCU 200 by the at least one sensing unit 50a, 50b, 50c, 60, 70a and 70b.

In one embodiment, the sensing units 50a, 50b, 50c, 60, 70a and 70b may include at least one of airbag impact sensors 50a, 50b and 50c, a moisture sensor 60, and impact sensors 70a and 70b. Accordingly, the BCU 200 may receive a signal output from the sensing units 50a, 50b, 50c, 60, 70a and 70b and transfer the received signal to the first fuses 20 and the positive and negative electrode second fuses 30 and 40.

In one embodiment, an airbag control unit 50 may be between the BCU 200 and the one or more airbag impact sensors 50a, 50b and 50c. In one embodiment, a signal output from the one or more airbag impact sensors 50a, 50b and 50c may be concurrently or simultaneously transferred to the BCU 200 and the airbag control unit 50. In another embodiment, a signal output from the one or more airbag impact sensors 50a, 50b and 50c may be transferred to the BCU 200 through the airbag control unit 50.

The first fuses 20 and the positive and negative electrode second fuses 30 and 40 may be operated concurrently or simultaneously, or individually. In one embodiment, the BCU 200 may individually control the first fuses 20 and the positive and negative electrode second fuses 30 and 40 according to the signal output from the airbag impact sensors 50a, 50b, 50c, the impact sensors 70a and 70b, and the moisture sensor 60.

In one embodiment, a few tens of battery cells 10 may be connected in the battery pack, and the BCU 200 is configured to control the state of each of the battery cells 10. When the battery pack is charged, the battery cells 10 may be charged and discharged to different energy levels while being repeatedly charged and discharged several times. If battery cells 10 of the plurality of battery cells 10 are discharged to different energy level and then charged again, the energy levels of the charged battery cells 10 may also be different from one another. If the charge and discharge are repeated several times in this state, some of the battery cells 10 may be overdischarged, and the potential to be used may become 0 V or less. If a user continuously discharges or uses the battery cells 10, a phenomenon in which the potentials of the battery cells 10 are changed may occur.

When the battery cells 10 with different energy levels are charged in the state that they are connected in series to one another, the battery cells 10 with relatively high energy levels transfer a charging completion signal to a charger before the battery cells 10 with relatively low energy levels reach the charged state. Accordingly, the charger completes the charging of the battery cells 10. Further, before the overdischarged battery cells 10 reach a completely charged state, the other battery cells 10 reach an overdischarging state. That is, some of the plurality of battery cells 10 repeat incomplete charging-overdischarging or battery reversal, and the other battery cells 10 repeat complete charging or overcharge-incomplete discharging. As a result, the battery cells 10 are damaged.

Therefore, the large-capacity battery pack according to an embodiment of the present invention may be provided with the BCU 200 for managing the state of each of the battery cells 10 so as to reduce damage of the battery cells 10. The first fuses 20 and the second fuses 30 and 40 may be connected to the BCU 200 so as to cut off current in the failure of the battery pack. The plurality of sensing units 50a, 50b, 50c, 60, 70a and 70b may be connected to the BCU 200 for transferring signals to the BCU 200 in the failure of the battery cells 10.

Figure 3:
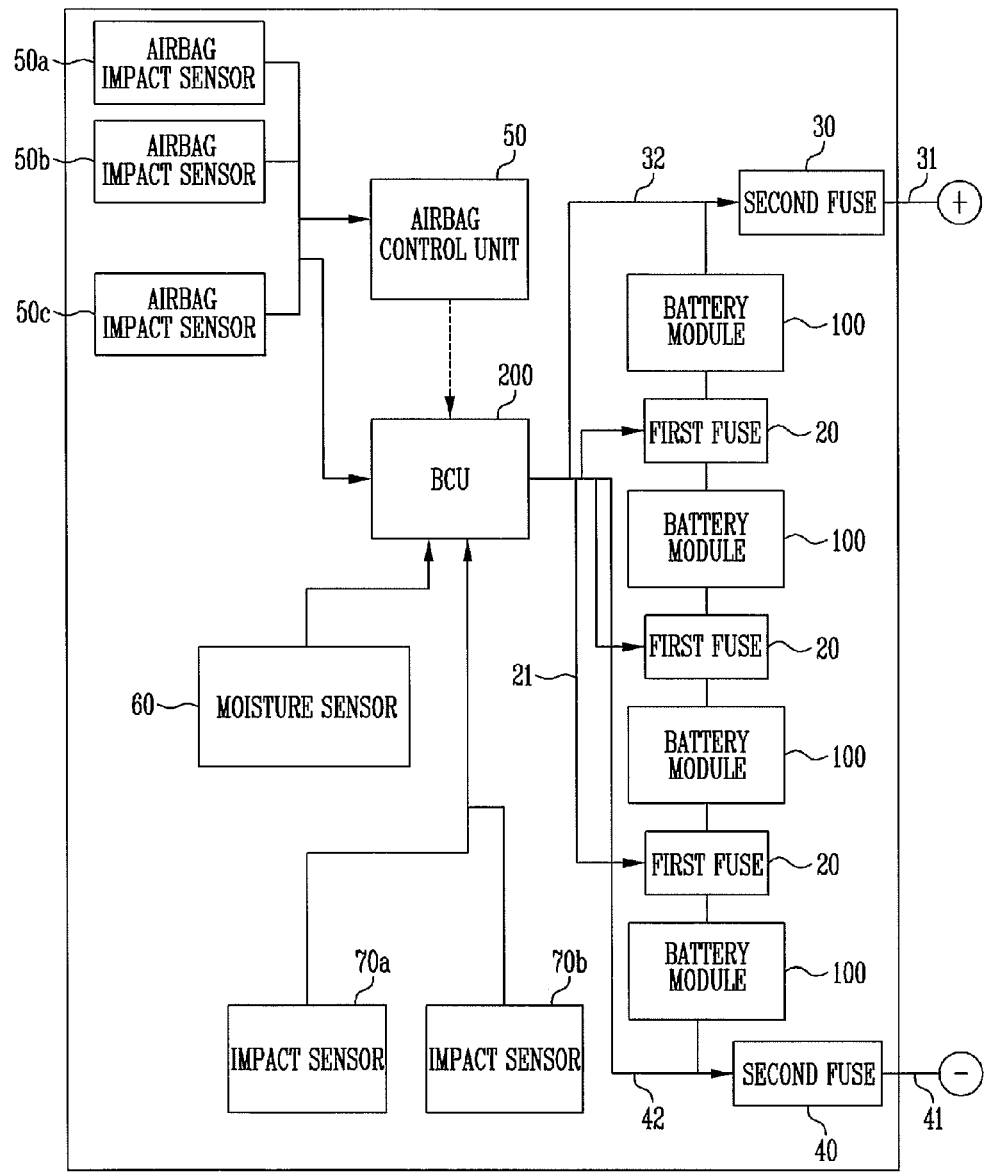
FIG. 3 is a schematic block diagram of a battery pack according to an embodiment of the present invention.

FIG. 3 is a schematic block diagram of a battery pack according to an embodiment of the present invention.

Referring to FIG. 3, a battery pack according to an embodiment of the present invention includes the battery modules 100, the first fuses 20, and the positive and negative electrode second fuses 30 and 40.

Each of the battery modules 100 includes the plurality of battery cells 10 (see FIG. 1), and the battery pack, in one embodiment, includes four battery modules 100, for example. The first fuse 20 is provided to the connection member 22 electrically connecting the battery modules 100 to each other. The positive and negative electrode second fuses 30 and 40 are installed on the output lines 31 and 41 of the battery modules 100, respectively.

Each of the first fuses 20 and the positive and negative electrode second fuses 30 and 40 is electrically connected to the BCU 200. The BCU 200 is electrically connected to the airbag impact sensors 50a, 50b and 50c, the moisture sensor 60, and the impact sensors 70a and 70b.

In one embodiment, the airbag impact sensors 50a, 50b and 50c may concurrently or simultaneously transfer a signal output therefrom to the airbag control unit 50 and the BCU 200. Accordingly, if the signal is output from the airbag impact sensors 50a, 50b and 50c, an airbag can operate and concurrently or simultaneously cut off the electrical connection between the battery modules 100. In one embodiment, the airbag impact sensors 50a, 50b and 50c may transfer the output signal to the BCU 200 through the airbag control unit 50.

Through the connection structure described above, the BCU 200 may control the first fuses 20 and the positive and negative electrode second fuses 30 and 40 according to the signal output from the plurality of sensing units 50a, 50b, 50c, 60, 70a and 70b. That is, the BCU 200 may cut off the electrical connection between the battery modules 100 by transferring the signal output from at least one of the sensing units 50a, 50b, 50c, 60, 70a and 70b to the first fuses 20. The BCU 200 may cut off the power of the battery pack itself by transferring the signal output from at least one of the sensing units 50a, 50b, 50c, 60, 70a and 70b to the positive and negative electrode second fuses 30 and 40.

If all the first fuses 20 between the battery modules 100 are operated, all the connections between the battery modules 100 are cut off, and thus, in one embodiment, the voltage of the battery pack can be decreased by ¼. Accordingly, when the insulation of the battery pack is broken due to impact or submergence, the output voltage of the battery pack is decreased to the voltage level of any one battery module 100, so that it is possible to reduce a risk of fire or electrical shock, thereby improving the safety of the battery pack.

In one embodiment, when at least one of the sensing units 50a, 50b, 50c, 60, 70a and 70b outputs a signal, the second fuses 30 and 40 are operated according to the signal output from the sensing units 50a, 50b, 50c, 60, 70a and 70b, thereby cutting off the entire power of the battery pack. The first fuses 20 and the positive and negative electrode second fuses 30 and 40 may be controlled to operate individually, or concurrently or simultaneously.

Figure 4:
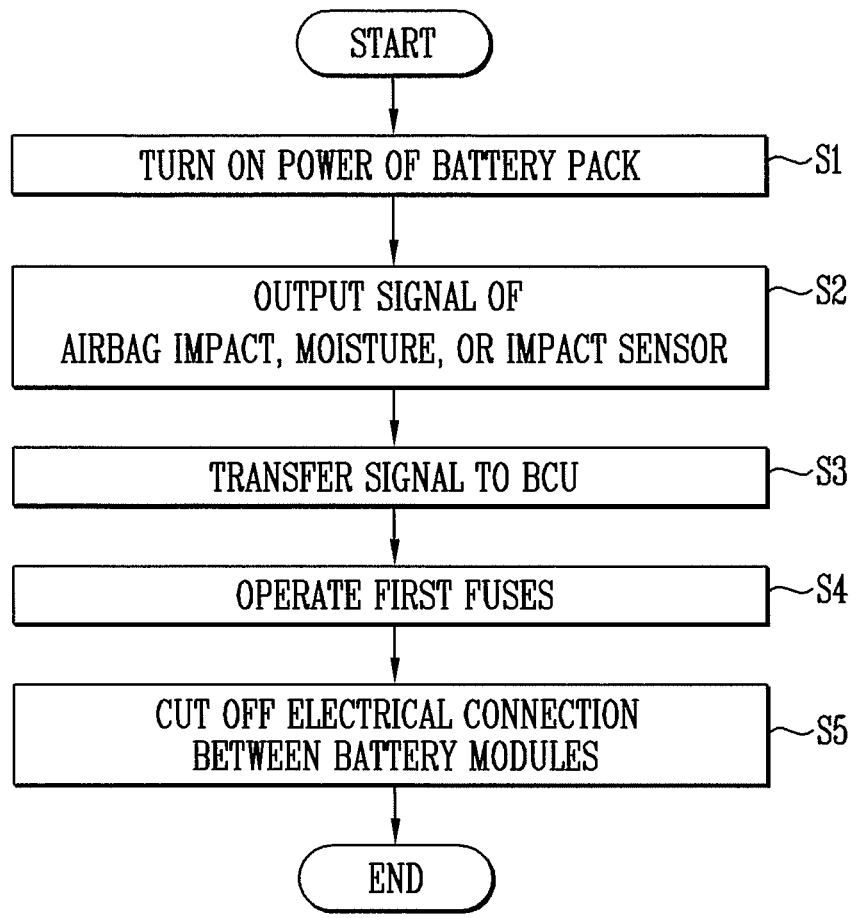
FIG. 4 is a flowchart illustrating an operation of a battery pack according to an embodiment of the present invention.

FIG. 4 is a flowchart illustrating an operation of a battery pack according to an embodiment of the present invention.

Referring to FIG. 4, the power of the battery pack is first turned on (S1).

Then, the airbag impact sensors 50a, 50b and 50c, the moisture sensor 60, and the impact sensors 70a and 70b, which are connected to the BCU 200, are operated by the power of the battery pack. When impact or moisture is not sensed, the sensing units 50a, 50b, 50c, 60, 70a and 70b do not output a signal. When damage of the battery pack is sensed, i.e. when the impact or moisture is sensed in the battery pack, the sensing units 50a, 50b, 50c, 60, 70a and 70b output a signal (S2).

The output signal of the sensed impact or moisture is transferred to the BCU 200 (S3). Then, the BCU 200 transfers the signal to the first fuses 20 to operate the first fuses 20 (S4). When operated, the first fuses 20 cut off electrical connections between the battery modules 100 (S5).

The first fuse 20, in one embodiment, is provided to the connection member 22 connecting the battery modules 100 to each other such that the signal output from the sensing units 50a, 50b, 50c, 60, 70a and 70b may be transferred to each of the first fuses 20 through the BCU 200. Thus, the voltage of the battery pack can be decreased by cutting off the flow of current between the battery modules 100. For example, when the insulation of the battery pack is broken, the electrical connections between the battery modules 100 may be cut off, such that a risk caused by electrical shock is prevented or reduced.

Figure 5:
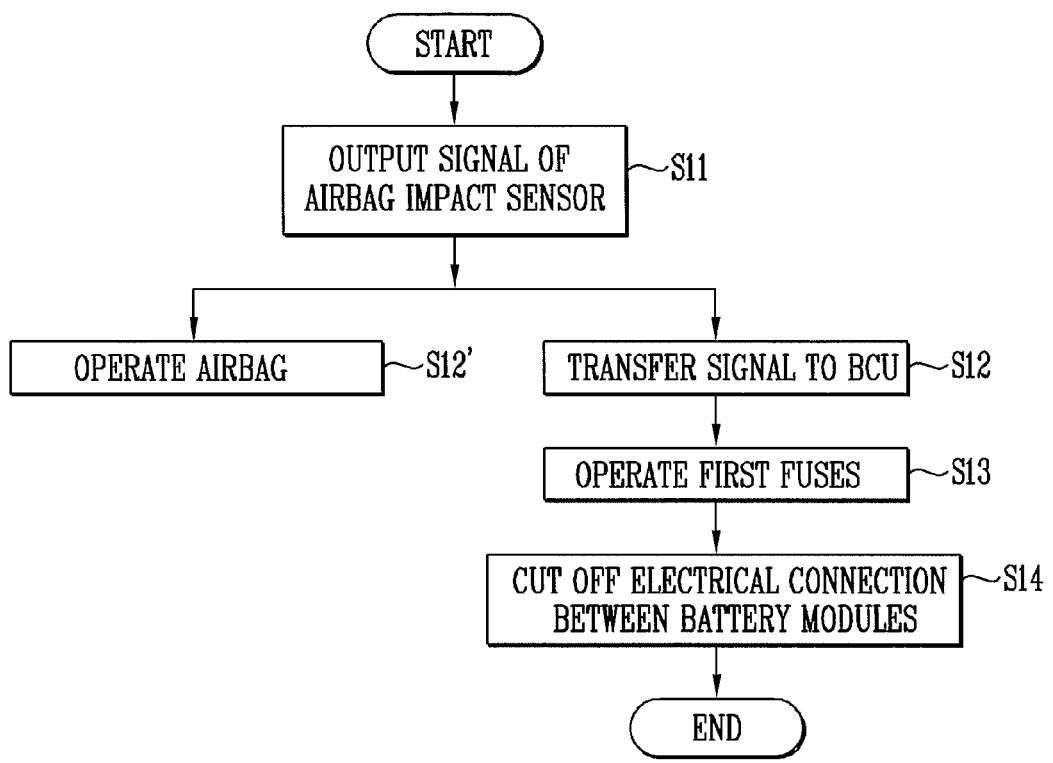
FIG. 5 is a flowchart illustrating an operation of a battery pack according to another embodiment of the present invention.

FIG. 5 is a flowchart illustrating an operation of a battery pack according to another embodiment of the present invention.

Referring to FIG. 5, if an impact is sensed by at least one of the airbag impact sensors 50a, 50b and 50c, the signal of the airbag impact sensors 50a, 50b and 50c is output (S11). The output signal may be concurrently or simultaneously transferred to the airbag control unit 50 and the BCU 200 (S12). In this case, the airbag may be operated (S12') according to the signal transferred to the airbag control unit 50.

The signal transferred to the BCU 200 is transferred to the first fuses 20 so that the first fuses 20 are operated (S13). When the signal generated from the airbag impact sensors 50*a*, 50*b* and 50*c* is transferred to the first fuses 20 through the BCU 200, the first fuses 20 are operated and the electrical connections between the battery modules 100 are thereby cut off (S14).

In one embodiment, when the insulation of the battery pack is broken due to impact or submergence, the output voltage of the battery pack is decreased to the voltage level of any one battery module 100, such that a risk of fire or electrical shock is prevented or reduced, thereby improving the safety of the battery pack.

Figure 6:
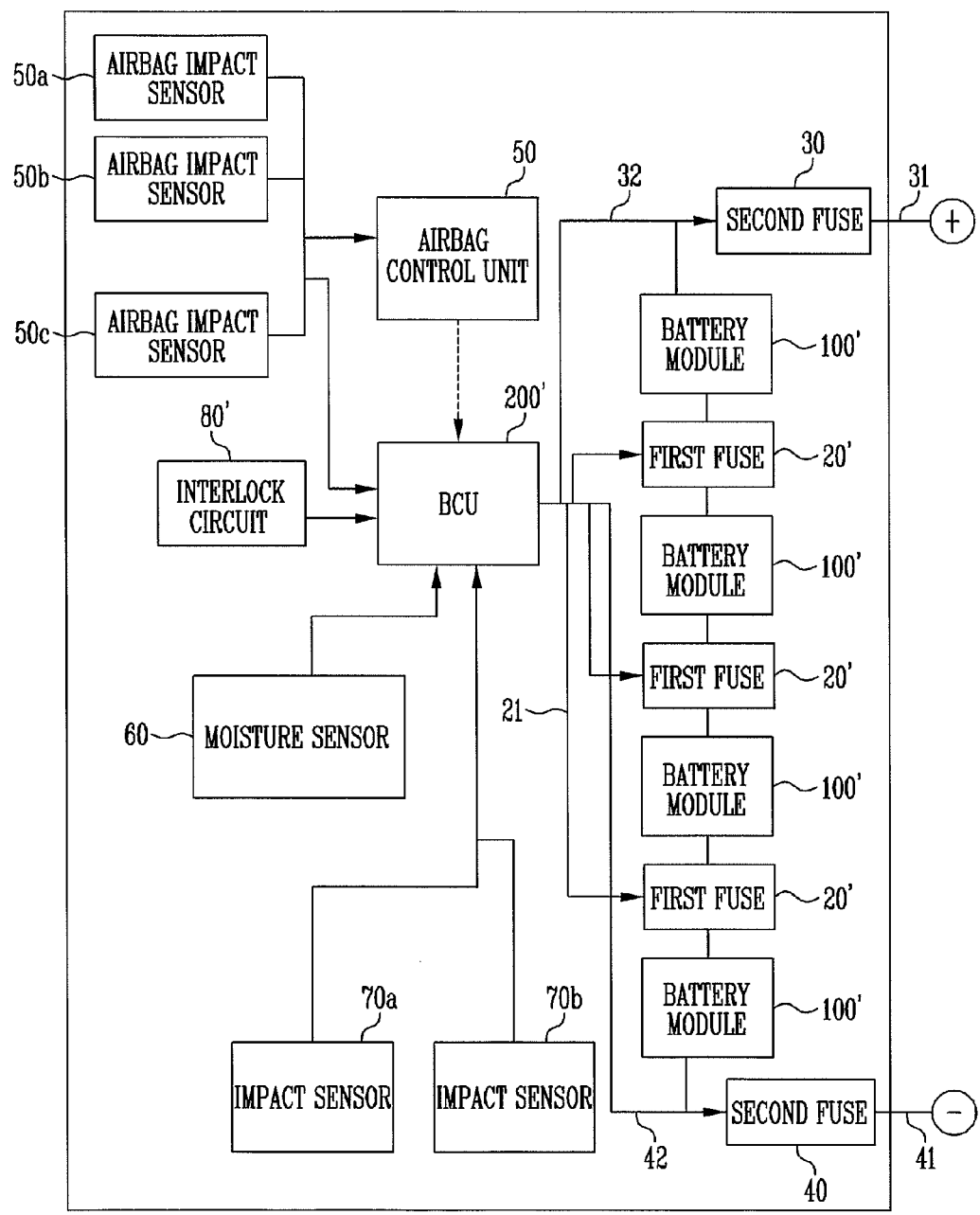
FIG. 6 is a schematic block diagram of a battery pack according to another embodiment of the present invention.

FIG. 6 is a schematic block diagram of a battery pack according to another embodiment of the present invention.

Referring to FIG. 6, the battery pack according to another embodiment of the present invention may further include an interlock circuit 80'. In the following description of this embodiment, description of the same components as described above will be omitted.

The battery pack including the interlock circuit 80' can selectively control first fuses 20' in the repair of the battery pack. That is, the first fuses 20' are operated without a signal from a BCU 200' in the repair of the battery pack, such that it is possible to cut off power between battery modules 100' of the battery pack.

According to embodiments of the present invention, the configuration and operation of the fuses are not limited to the above description and accompanying drawings, but, rather, it will be apparent to those skilled in the art that the fuses may include any other suitable fuses.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
    a plurality of battery modules, each respective battery module of the plurality of battery modules comprising a plurality of battery cells arranged in a direction and connected to one another between first and second terminals of the respective battery module;
    at least one first fuse connected to at least one connection line between battery modules of the plurality of battery modules, the at least one connection line connecting between the first terminal of a first battery module of the plurality of battery modules and the second terminal of a second battery module of the plurality of battery modules;
    a battery control unit connected to the at least one first fuse; and
    at least one sensing unit connected to the battery control unit,
    wherein the battery control unit is configured to control the at least one first fuse in response to a signal received from the at least one sensing unit,
    wherein the at least one first fuse comprises a power cutoff unit at a region of a connection member connecting the battery modules to each other, and a case surrounding the power cutoff unit, and
    wherein when the at least one first fuse receives a signal from the battery control unit, the at least one first fuse cuts off electrical connection between the first battery module and the second battery module.

2. The battery pack according to claim 1, wherein pressure or heat is generated in the power cutoff unit by the signal transferred from the battery control unit.

3. The battery pack according to claim 1, wherein the at least one sensing unit comprises an airbag impact sensor.

4. The battery pack according to claim 3, further comprising an airbag control unit between the airbag impact sensor and the battery control unit.

5. The battery pack according to claim 4, wherein the airbag impact sensor concurrently transfers the signal to the battery control unit and the airbag control unit.

6. The battery pack according to claim 4, wherein the airbag impact sensor transfers the signal to the battery control unit through the airbag control unit.

7. The battery pack according to claim 1, wherein the at least one sensing unit comprises an airbag impact sensor, a moisture sensor, and an impact sensor.

8. The battery pack according to claim 1, wherein the battery control unit is connected to the power cutoff unit of the at least one first fuse by a signal input line.

9. The battery pack according to claim 1, further comprising a second fuse on an output line of the battery module.

10. The battery pack according to claim 9, wherein the at least one first fuse and the second fuse are operated concurrently or individually.

11. The battery pack according to claim 1, further comprising a second fuse on an input line of the battery module.

12. The battery pack according to claim 1, further comprising an interlock circuit configured to selectively control the at least one first fuse for repairing the battery pack.

* * * * *